May 8, 1928.

W. L. BARTHOLD 1,669,277

PRETZEL MAKING MACHINE

Filed March 7, 1927  5 Sheets-Sheet 1

INVENTOR.
Willis L. Barthold,
BY William W. Deane.
his ATTORNEY.

May 8, 1928. 1,669,277
W. L. BARTHOLD
PRETZEL MAKING MACHINE
Filed March 7, 1927 5 Sheets-Sheet 3

Inventor
Willis L. Barthold.
By William W. Deane.
his Attorney

Patented May 8, 1928.

1,669,277

UNITED STATES PATENT OFFICE.

WILLIS L. BARTHOLD, OF YORK, PENNSYLVANIA.

PRETZEL-MAKING MACHINE.

Application filed March 7, 1927. Serial No. 173,314.

This invention relates to improvements in pretzel making machines, and has for its object to provide a machine of this type embodying such simple principles of structure as to render it highly practical from the standpoint of economy of manufacture and efficiency in operation.

A further object is a provision of a machine of this type wherein all steps in the manufacture of the pretzels is performed automatically and without manual superintendence.

A further object is a provision of a machine wherein a strip of dough of appropriate diameter and length is deposited upon a former mechanism, by which it is formed into the proper shape, and subsequently released for delivery to the bake oven.

A further object is a provision of a machine of this type wherein all the various mechanisms are operated in proper sequence from a single drive shaft.

Figure 1:
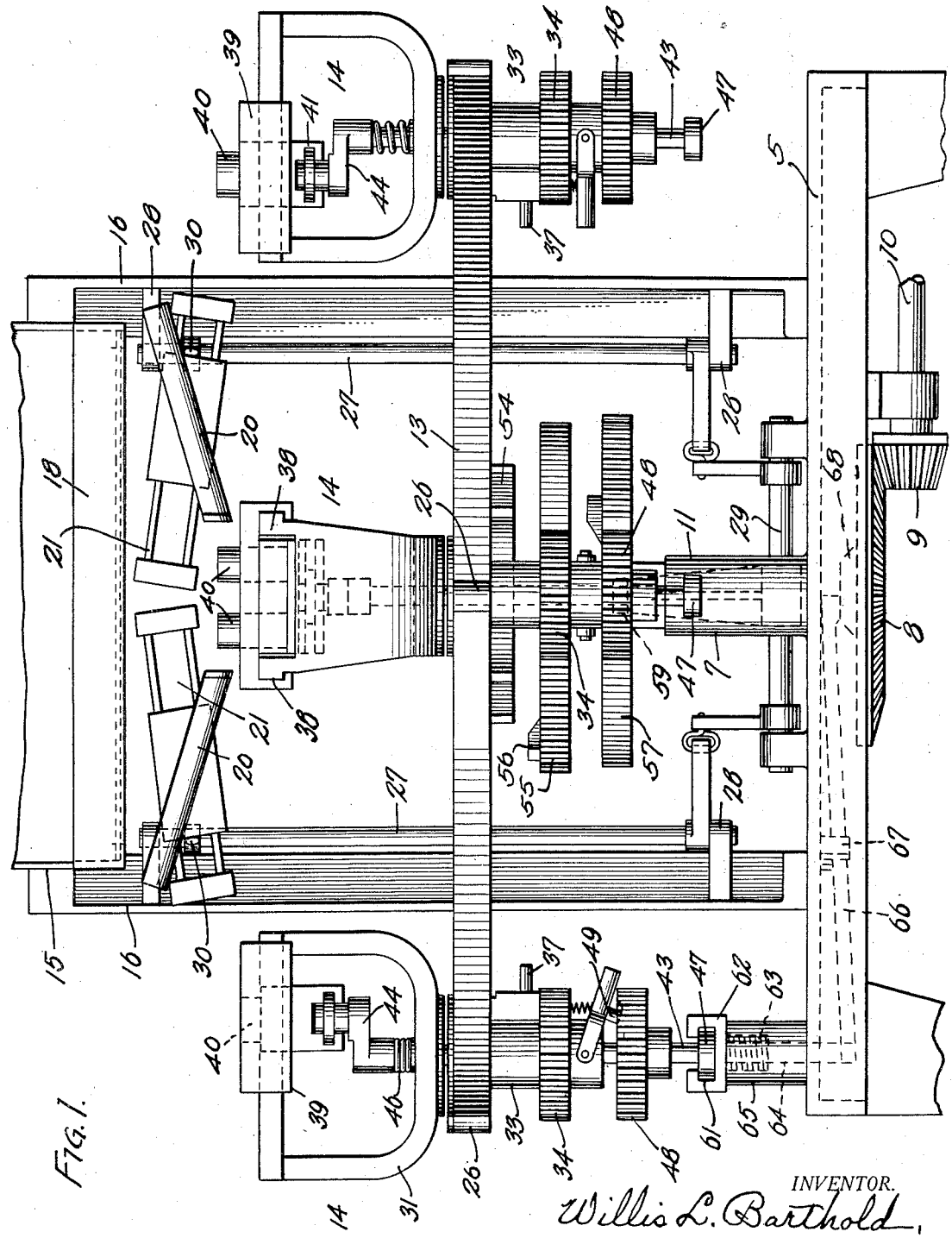
Figure 2:
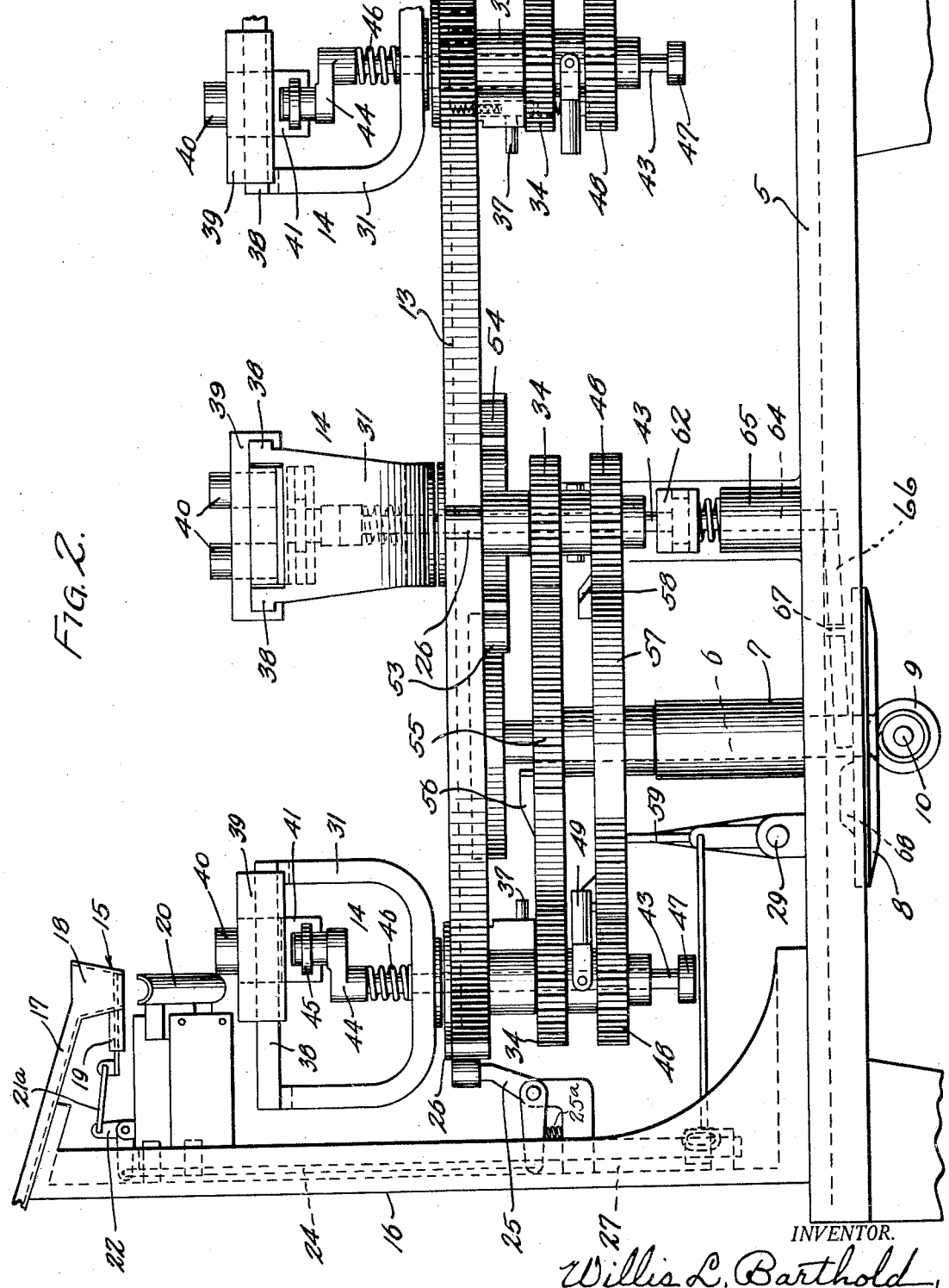
Figure 3:
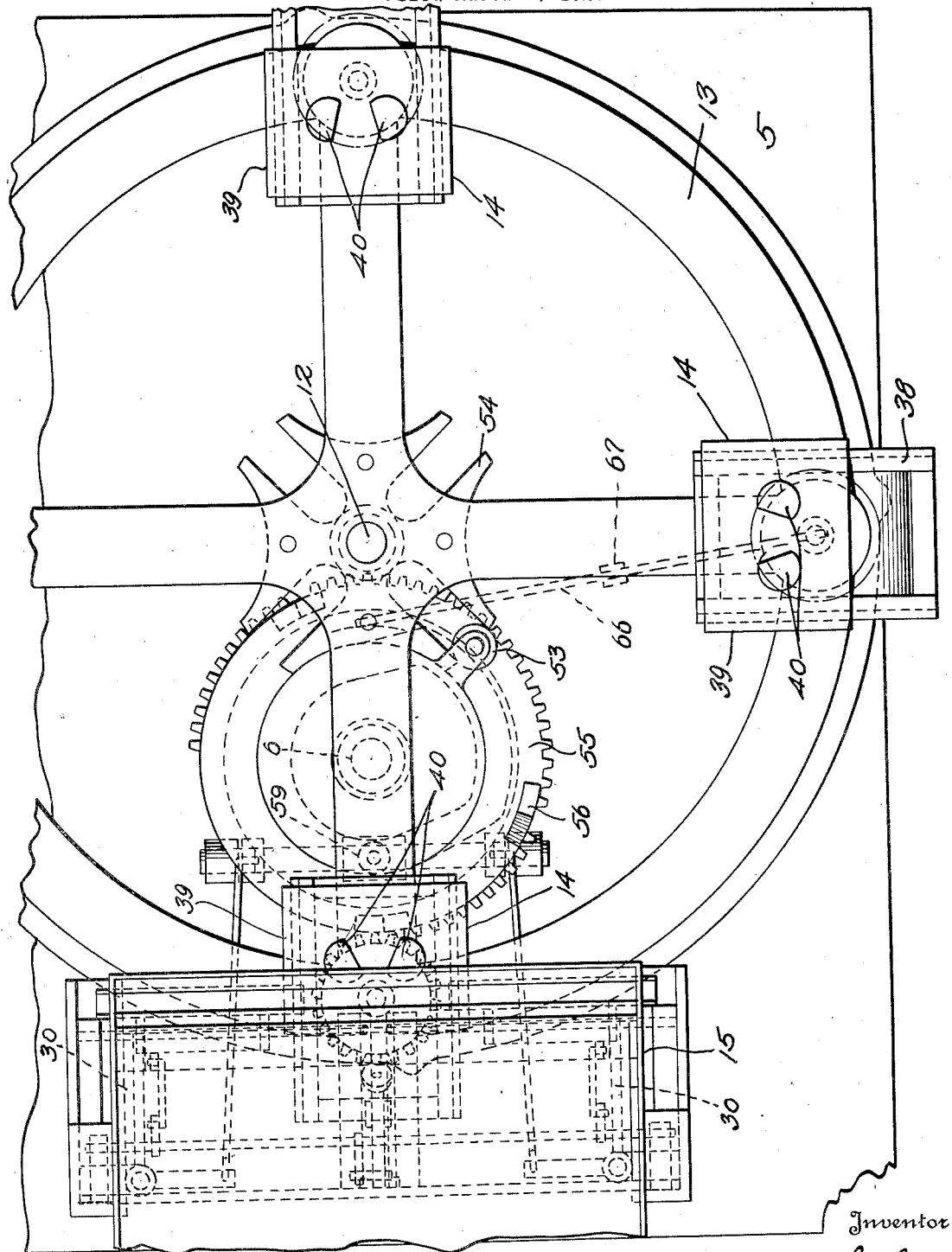
Figure 4:
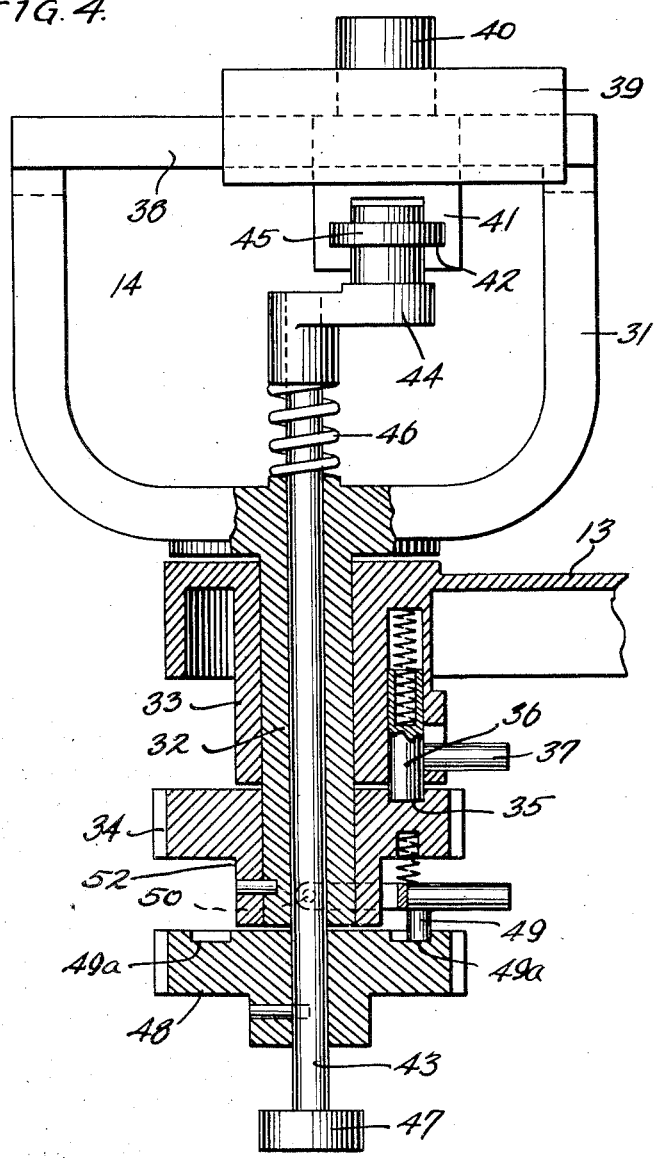

In the accompanying drawing wherein an improved embodiment of the invention is illustrated:

Fig. 1 is a front elevation of the machine.
Fig. 2 is a partial side elevation thereof.
Fig. 3 is a partial top plan view.
Fig. 4 is a detail, partly in section, on an enlarged scale of one of the forming devices.
Figs. 5-9 are detailed views of a forming device, showing the various steps in the formation of the pretzel.

Referring to the drawing in detail:

A numeral 5 indicates a support on which all the various parts of the machine are mounted, and also the vertical drive shaft 6 which is journaled in a bearing 7 and driven through a bevel pinion 8 and 9 from the power shaft 10.

At one side of the bearing 7 there is arranged a second bearing 11, in which is journaled the stub shaft 12 of the rotatable table 13. The table carries a plurality of former devices 14. In the present embodiment of the invention four of such devices have been shown, but it will be understood that the number may be increased in accordance with requirements. At one side of the table 13 there is arranged the dough feeding mechanism 15, which is supported on an upright 16 and includes an inclined chute 17, onto which a strip of dough, which has been previously rolled out in cylindrical form by a suitable machine, is deposited, and from which it rolls into the hopper 18. A sliding gate 19 is arranged under the hopper 18 and upon the opening of the gate the strip of dough in the hopper is discharged therefrom and falls upon the oppositely inclined holders 20.

The holders 20 are arranged in spaced relation, and inclined upwardly from their adjacent ends to their opposite extremities. Each holder is slidably mounted on a guide 21 carried by the upright 16, and the guides inclined upwardly from their outer to their inner ends for a purpose which will hereinafter appear.

The sliding gate 19 is opened through a link 21ª, lever 22, rod 24 and lever 25 by cams 26 on the table 13, the arrangement of the cams being such that when one of the former devices 14 comes into position under the feeding mechanism 15, the gate 19 will be opened to deposit a strip of dough in the holders 20. Immediately after the lever 25 is disengaged from the cams 26 the gate is closed by the action of a coiled spring 25ª disposed between one end of the lever 25 and its supporting bracket, as shown in Figure 2. The action of the spring is imparted to the gate through the rod 24, lever 22 and link 21ª as will be readily understood.

The movement of the holders 20 along the guides 21 is effected by rock shafts 27 journaled in bearings 28 on the uprights 16 oscillated by link connection from a shaft 29 mounted on the support 5. The manner of operation of the shaft 29 will be hereinafter more fully described, while the movement of the shaft 27 is transmitted to the holders 20 through the arms 30.

Each former device includes a yoke-shaped frame 31 having a depending tubular shaft 32 journaled in a bearing 33 on the table 13. At its lower extremity the shaft 32 carries a gear wheel 34 having a recess 35 at one point therein to receive a spring actuated detent 36, whereby the gear wheel and frame 31 are locked against rotation in proper position. The detent 36 is provided with a laterally projecting pin 37.

The top of each frame 31 is provided with guides 38 on which is slidably mounted a carrier 39 receiving a pair of former pins 40 which in turn are carried by a channeled guide 41 arranged beneath the carrier 39. The channel 42 in the guide 41 is arranged at right angle to the guides 38, so that upon rotation of the shaft 43 and crank arm 44 carried thereby sliding motion is imparted to each carrier 39 by the roller 45 engaging in the channel 42. The shaft 43 is rotatable and also axially movable, and is normally retained in elevated position by a spring 46 maintaining the guide 41 in engagement with the under side of the carrier 39.

The lower extemity of the shaft 43 carries a head 47 for a purpose which will hereinafter appear, and above said head there is secured a gear wheel 48 coacting with a detent 49, which is spring actuated and adapted to enter a recess 49ª in the face of the wheel. The detent 49 is pivotally secured at 50 to the hub 52 of the gear 34, whereby the gear 48 and shaft 43 are, at times locked with the gear wheel 34.

The upper extremity of the drive shaft 6 carries the drive member 53 of a Geneva gear, the driven part 54 of which is carried by the stub shaft 12 whereby intermittent rotary movement is imparted to the table 13. A gear wheel 55 is also carried by the shaft 6, and is adapted to mesh with the gear wheels 34 when the latter are brought into position by the rotation of the table 13. The gear 55 is provided with groups of teeth corresponding in number to the number of forming devices 14, so that as each of the latter is presented to the feed mechanism 15 the gear wheel 34 is caused to turn through one revolution, having been released by engagement of the cam 56 with the pin 37 of the detent 36.

A second gear wheel 57 is secured to the shaft 6 and is adapted to mesh with the wheels 48. The gear 57 is provided with groups of teeth corresponding in number to the number of former devices 14, and each group is divided into two sets, one set turning the gear wheel 48 and crank 44 through one-half revolution to slide the carrier 39 across the holders 20, and the other set acting subsequently to turn the shaft 43, the remaining portion of the revolution to return the carrier to its initial position. The release of the gear 48 is effected by a cam 58 carried by the gear 57 and coacting with the detent 49.

The actuation of the rock shaft 27 and shaft 29 is effected in timed relation to the movement of the table 13 by an arm 59 engaging the internal cam face of the gear 57.

As one of the former devices 14 is moved from position under the feed mechanism 15 and the following former device is presented thereto, the first mentioned former device moves to a position where the head 47 of the shaft 43 enters the channel 61 formed in the shaft retracting member 62, which is normally held in elevated position by a spring 63 and is carried by a spindle 64 working in a guide 65. The lower extremity of the spindle 64 is pivotally connected with a lever 66 pivotally secured at 67 to the support 5 and coacting with cams 68 on the gear wheel 8, whereby the retracting member 62 is moved downwardly as the head 47 of each shaft 43 is engaged therein to move said shaft axially and displace the former pins 40 so that they occupy a position flush with the carrier 39.

Figure 5:
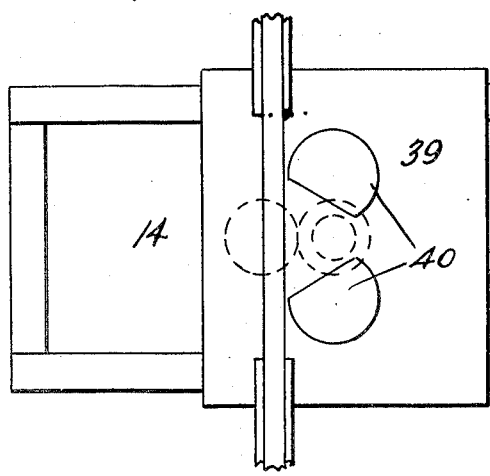
Figure 6:
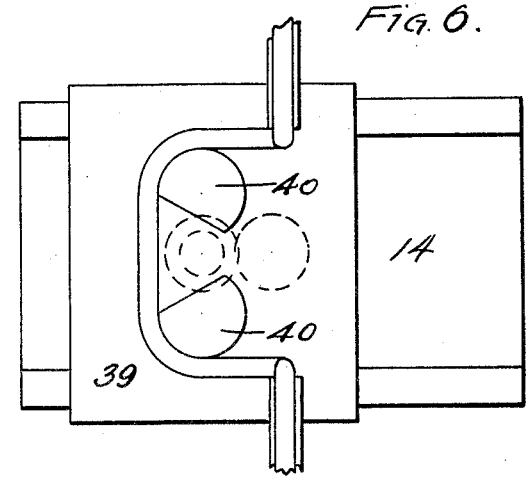
Figure 7:
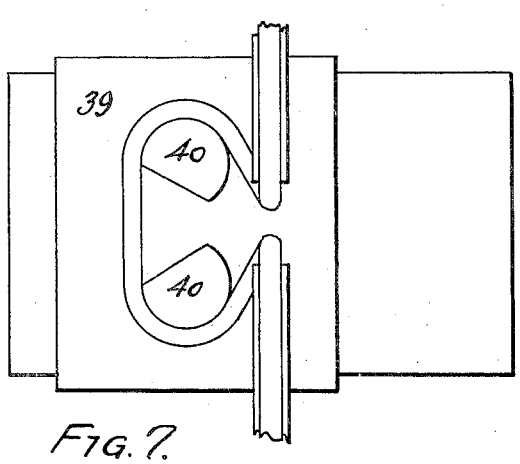
Figure 8:
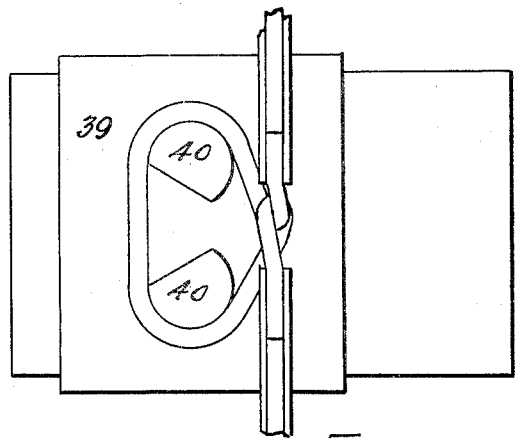
Figure 9:
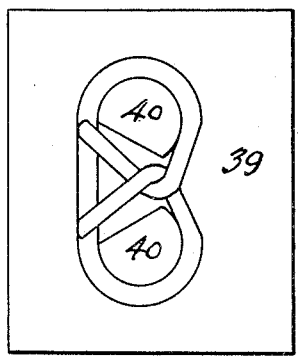

In operation, a strip of dough is deposited on the chute 17 and sliding downwardly occupies the hopper 18. The initial step is the opening of the gate 19 effected by engagement of the cam 26 with the arm 25 as one of the former devices 14 is brought under the holders 20 by rotation of the table 13. Thus, when the gate 19 is opened, the strip of dough falls into the holders 20, the medium portion of the strip extending across the space between said guides as shown in Fig. 5. Simultaneously, the detent 49 is released by the cam 58 and the gear 48 and shaft 43 turned a half revolution by the gear 57, thus sliding the carrier 39 to the opposite ends of the guides 38 entraining the portion of the strip of dough lying between the holders 20 around the sides of the former pins, as shown in Figure 6, thus performing the initial step in the formation of the pretzel. At this stage the internal cam face of the gear 57 actuates the arm 59 which rocks the shaft 29 and which in turn rocks the vertical shafts 27 causing the arms 30 to move the holders 20 toward each other, and upwardly on the inclined guides 21. This movement of the holders carries the ends of the strip of dough around the front of the former pins as shown in Fig. 7. The gear 48 is provided with two opposed recesses 49ª for receiving the detent 49, and when said gear has been turned through one half revolution, as described in the foregoing, the detent 49 which was raised by the cam 58 falls into the other recess 49ª, thus locking the two gears 34 and 48 together. The holders 20 are thus retained in close relation for a period during which the gear wheel 55, acting on the gear 34, rotates the frame 31, and parts carried thereby through one revolution. During rotation of the frame 31, its motion is transmitted to the shaft 43 by the detent 49 engaging in one of the recesses 49ª, and hence said shaft 43, together with the crank arm 44, are turned bodily. During the initial sliding movement of the carriage 39, the entrained medial portion of the dough length assumes the shape shown in Fig. 6, while during the turning movement of the frame 31 the dough strip is twisted in the characteristic way, as shown in Fig. 8. Subsequently, one of the cams 58 of the gear 57 disengages the detent 49, and the second set of teeth of the group of teeth on the gear 57 effects a completion of the revolution of the gear 48, returning the carriage 39 to its initial position.
Coincident with the return of the carriage to its initial position, by the arms 30, actuated through rock shafts 27 and 29, which are now turned in a reverse direction by the engagement of the arm 59 by another part of the cam face of the gear 57, the holders 20 are moved apart thereby spreading the ends of the strip of dough until the ends finally drop from the holders onto the portion of the formed pretzel beneath the same and in which said ends assume the position shown in Fig. 9, thus completing the formation of the pretzel. At this stage, the table 13 is turned a quarter revolution by the Geneva gear 53, 54, and the head 47 is brought into the retracting member 62, where, upon actuation of the lever 66, the shaft 43, guide 41 and pins 40 are moved downwardly permitting removal of the formed pretzel from the carrier 39 for transportation to the oven. It will be understood that, as the former device just described, approaches the retracting member 62 another former device 14 is presented under the hopper 18, and the operation above described is repeated.

What I claim is:

1. In a pretzel making machine, a dough strip feed means, a rotatable table, former devices carried by said table and adapted to be successively presented thereby to the strip feed means, means for actuating the strip feed means upon presentation of one of the former devices thereto and means for subsequently actuating the former devices, and oppositely inclined slidably mounted holders adapted to receive the dough strip delivered by the feed means, said holders being movable toward and away from each other for cooperation with said former devices.

2. A machine, as claimed in claim 1, characterized in that said former devices, each include a pair of pins adapted to pass between the holders when the latter are moved away from each other and to entrain the medial portion of the dough strip which lies between the inner ends of the holders.

3. A machine, as claimed in claim 1, characterized in that said former devices, each include a pair of pins adapted to pass between the holders and entrain the medial portion of the dough strip, and means for turning the pins to produce a twist in the dough strip.

4. A machine, as claimed in claim 1, characterized by a provision of means for moving the holders together, said former devices each including a pair of pins adapted to entrain the medial portion of a dough strip, and means for turning said pins to produce a twist in the strip subsequent to the movement of the holders together.

5. A machine, as claimed in claim 1, char-
acterized by a provision of means for moving the holders together, said former devices each including a pair of pins adapted to entrain the medial portion of a dough strip, and means for turning said pins to produce a twist in the strip subsequent to the movement of the holders together, and means for withdrawing said pins to facilitate removal of the formed strip.

6. A machine, as claimed in claim 1, characterized in that each of said former devices includes a rotatable frame adapted upon rotation to form a twist in the dough strip, a carrier movable on the frame, means for imparting movement to the carrier, axially movable pins mounted in the carrier, and means for imparting rotary movement to the frame and carrier.

7. A machine, as claimed in claim 1, caracterized in that each of said former devices includes a rotatable frame adapted upon rotation to form a twist in the dough strip, a carrier movable on the frame, means for imparting movement to the carrier, axially movable pins mounted in the carrier, and means for imparting rotary movement to the frame and carrier, and means for withdrawing the pins to facilitate removal of the formed strip.

8. In a pretzel making machine, a dough strip feed means, a rotatable table, former devices carried by said table and adapted to be successively presented thereby to said strip feed means, means for actuating said strip feed means upon presentation of one of said former devices thereto, each of said former devices comprising a rotatable frame, a carrier movable on said frame, holders adapted to receive the dough strip delivered by said feed means, said holders being movable toward and from each other for cooperation with said former devices, means for imparting rotary movement to said frame and carrier, and drive means common to the strip forming means, the table, the former devices and the holders.

9. A pretzel making machine, including dough strip feed means, laterally movable dough strip holders associated with the feed means and normally disposed in spaced relation, means for laterally moving said holders toward and away from each other, a rotatable table, former devices carried by said table, said former devices each including a movable carriage, and means on said carriage adapted, upon movement of the latter in one direction, to entrain the portion of the dough strip lying between the holders.

10. A machine, as claimed in claim 9, characterized by the provision of means for imparting rotary motion to the former devices to produce a twist in a portion of the dough strip.

11. A machine, as claimed in claim 9, characterized by the provision of means for imparting rotary motion to the former devices to produce a twist in a portion of the dough strip, and means for effecting movement of the carriage first in one direction and then in the other direction to first entrain the medial portion of the dough strip, and, subsequent to the twisting of the dough strip, to withdraw the ends of the latter from the holders.

12. A machine, as claimed in claim 9, characterized by the provision of means for imparting rotary motion to the former devices to produce a twist in a portion of the dough strip, and means for moving the holders together during the rotary motion of the former devices.

13. A machine, as claimed in claim 9, characterized by the provision of means for imparting rotary motion to the former devices to produce a twist in a portion of the dough strip, and means for effecting movement of the carriage first in one direction and then in the other direction to first entrain the medial portion of the dough strip, and, subsequent to the twisting of the dough strip, to withdraw the ends of the latter from the holders, and means for moving the holders together during the twisting of the dough strip and for moving said holders apart as the ends of the dough strip are withdrawn from the holders during movement of the carriage.

14. In a pretzel machine, a former device including a table, a rotatable frame on the table, a carriage movable on the frame, former elements on the carriage, means for turning the carriage and frame bodily, and means for effecting periodic movement of the carriage independently of the frame.

15. In a pretzel machine, a former device including a table, a rotatable frame on the table, a carriage movable on the frame, former elements on the carriage, means for turning the carriage and frame bodily, and means for effecting periodic movement of the carriage independently of the frame, and means for displacing the former elements relative the frame.

16. In a pretzel machine, a former device including a table, a rotatable frame on said table, a carriage movable on said frame, former elements on the carriage, means for displacing the carriage in one direction on the frame, means for locking the frame and carriage together, means for turning the carriage and frame bodily, and means for subsequently releasing the locking means and returning the carriage to initial position.

17. In a pretzel machine, a former device including a table, a rotatable frame on said table, a carriage movable on said frame, former elements on the carriage, means for displacing the carriage in one direction on the frame, means for locking the frame and carriage together, means for turning the carriage and frame bodily, and means for subsequently releasing the locking means and returning the carriage to initial position, said pins being displaceable, means normally retaining said pins in operative position, and means for withdrawing said pins to inoperative position.

18. In a pretzel making machine, an inclined chute adapted to receive rolled strips of dough, a hopper to receive the dough strips from said chute, a periodically actuated gate for said hopper whereby the dough strips are successively discharged from said hopper, opposite, outwardly and upwardly inclined trough shaped holders arranged beneath said hopper, inwardly and upwardly inclined means for slidably supporting said holders, means for moving said holders toward and away from each other on said inclined supports, and forming devices associated with said holders.

In testimony whereof I affix my signature.

WILLIS L. BARTHOLD.